June 5, 1945.  A. W. OEHLER  2,377,805
HARVESTER
Filed July 24, 1943  2 Sheets-Sheet 1

INVENTOR.
ALVIN W. OEHLER

ATTORNEYS

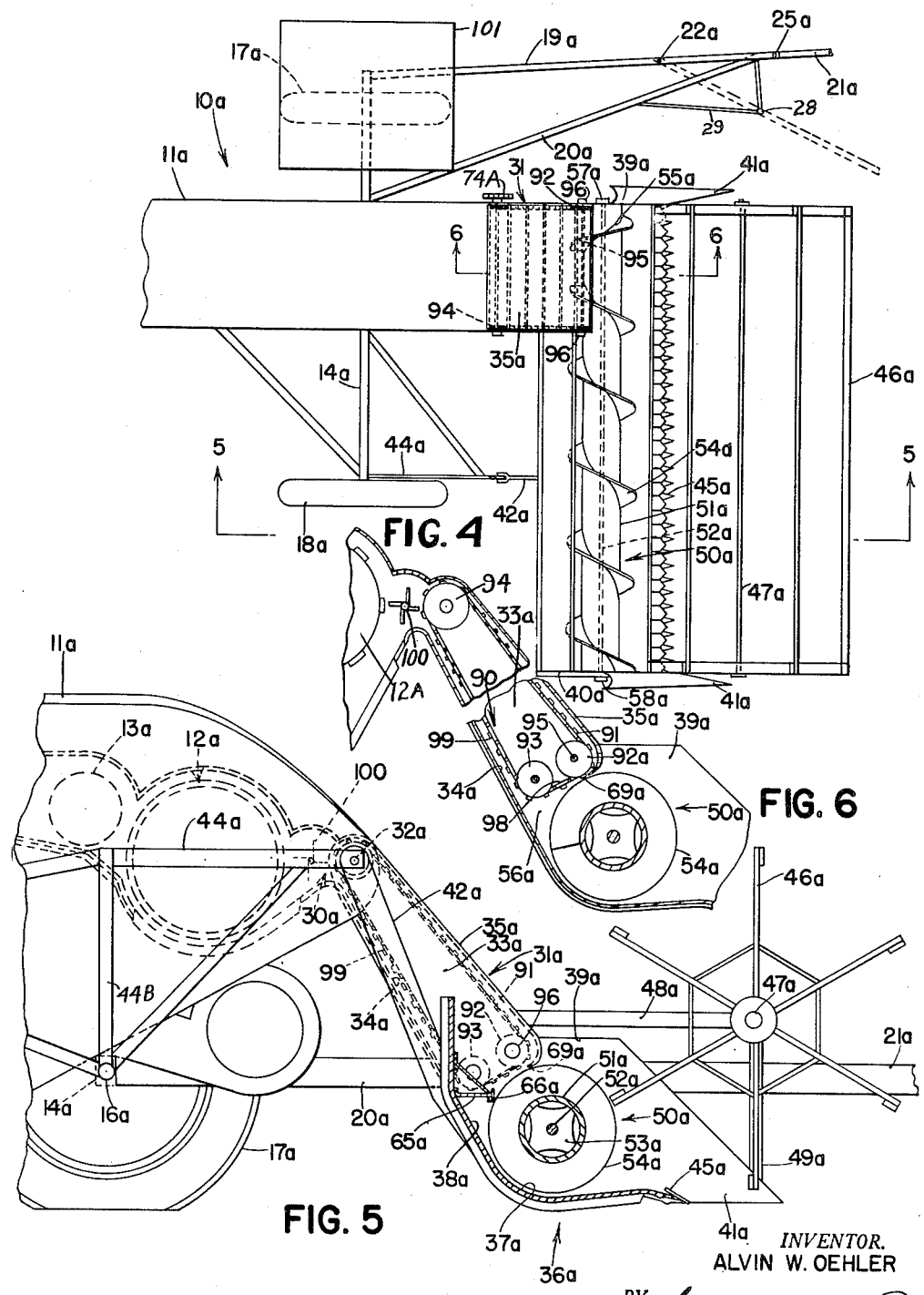

Patented June 5, 1945

2,377,805

UNITED STATES PATENT OFFICE 2,377,805

HARVESTER

Alvin W. Oehler, Moline, Ill., assignor to Deere & Company, Moline, Ill., a corporation of Illinois Application July 24, 1943, Serial No. 496,263

16 Claims. (Cl. 56—123)

The present invention relates generally to harvesters and more particularly to the means for gathering the harvested crops and moving them into a crop treating mechanism such as a threshing cylinder or other device within the body of the harvester.

The principal object of my invention relates to the provision of a novel and improved harvesting mechanism of the type adapted to cut a swath of maximum width and deliver the severed crop to a threshing mechanism having a width adapted for maximum efficiency of operation. A further object of my invention relates to the provision of a harvester of the type comprising a wide cutter bar and a comparatively narrow crop treating housing in which the crop is moved from the cutter bar to the housing by a transverse auger conveyor, and in which the cutter bar extends across the forward end of the crop treating housing as well as across the remainder of the harvester platform. More specifically, it is an object of the present invention to provide a harvester having a harvesting platform extending forwardly and laterally from the forward end of the feeder housing, and a cutter bar extending across the entire width of the platform in order to obtain a maximum width of cut for the size of the machine.

Still another object relates to the provision of a harvester platform having a transverse auger conveyor which extends the entire length of the cutter bar and a feeder house extending rearwardly from a position behind the auger and cutter bar, whereby the auger extends across the forward end of the feeder house and to provide a novel and improved feeder within the feeder house which not only transports the harvested crop rearwardly within the feeder house but also strips the crop from the portion of the auger ahead of the feeder house.

This application is a continuation-in-part of a co-pending application, Serial No. 400,387, filed by me June 30, 1941, now Patent No. 2,332,006, granted October 19, 1943.

These and other objects and advantages of my invention will be apparent to those skilled in the art after a consideration of the following description, in which reference is had to the drawings appended hereto, in which Figure 1 is a plan view of a harvesting machine embodying the principles of the present invention.

Figure 4 is a plan view showing a modified form of my invention.

Figure 5 is a side elevational view taken partly in section, along a line 5—5 in Figure 4, and drawn to an enlarged scale, the near wheel being removed to expose other parts.

Figure 6 is a fragmentary sectional elevational view taken along a line 6—6 in Figure 4 and drawn to an enlarged scale.

Figure 1:
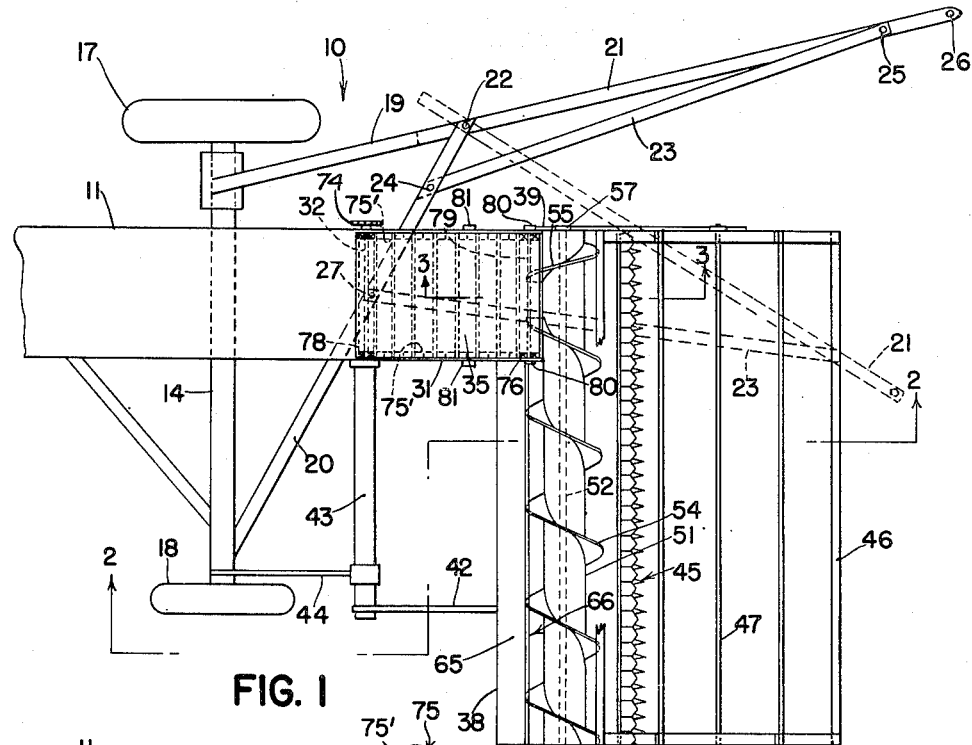
Figures 2, 3:
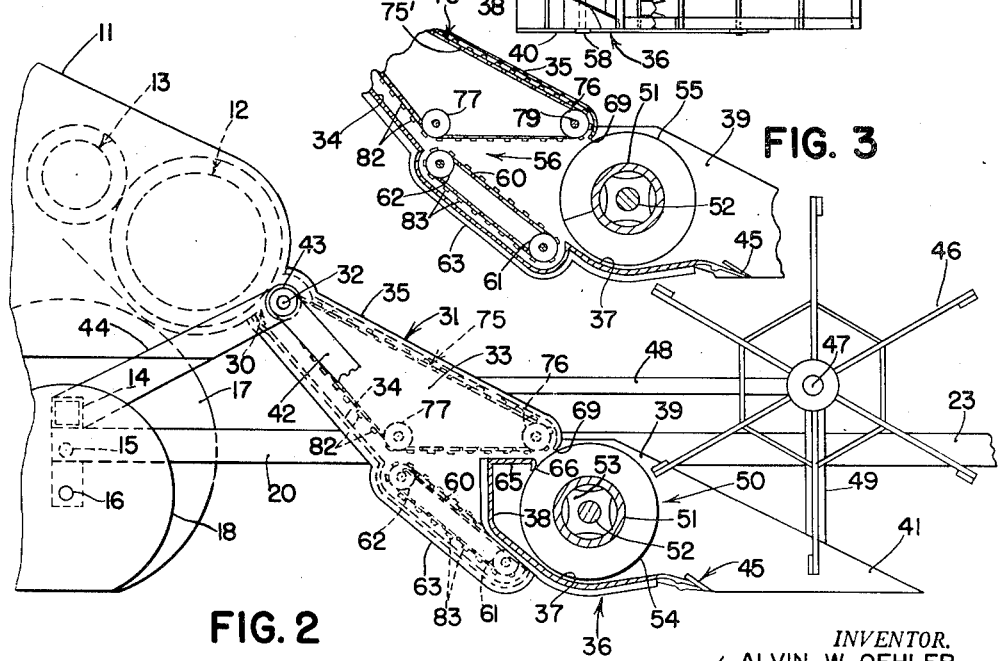
Figure 2 is a side elevational view of the forward portion of the harvesting machine, taken partly in section, as viewed along the line 2—2 in Figure 1, and drawn to an enlarged scale.
Figure 3 is a sectional elevational view taken along the line 3—3 in Figure 1 and drawn to an enlarged scale.

Referring now to the drawings and more particularly to Figures 1, 2 and 3, the harvesting machine, specifically a harvester thresher, is indicated in its entirety by reference numeral 10 and comprises a narrow longitudinally extending body 11 containing suitable crop treating mechanism, such as for example, a threshing cylinder 12 disposed at the forward end of the body 11. A separating cylinder is indicated at 13 behind the threshing cylinder 12, for purposes well-known to those skilled in the art. The body 11 is mounted on a draft frame including a transversely disposed supporting beam 14, mounted at opposite ends thereof, respectively, on a pair of stub axles 15, 16, on which are journaled ground wheels 17, 18, respectively. A pair of draft members 19, 20 are connected at their rear ends to the beam 14 and extend forwardly and laterally in converging relation. At the juncture between the two members 19, 20 a draft tongue 21 is pivotally connected by means of a vertical pivot pin 22, providing for lateral swinging movement of the tongue 21 relative to the draft frame. The tongue 21 is braced laterally by means of a diagonal bracing member 23, pivotally connected to the frame member 20 by means of a vertical bolt 24, while its forward end is connected by a vertical bolt 25 to the tongue 21 near the forward end of the latter. The forward end of the tongue 21 is provided with an opening 26 to receive a coupling pin for connecting the implement to a tractor or other suitable draft means. Normally, the draft tongue extends forwardly and laterally beyond the stubbleward wheel 17, to provide for drawing the implement in laterally offset relation to the tractor, but during transport when the implement is being drawn along roads and through narrow gates, the overall width of the implement can be reduced by removing the bolt 24 and shifting the draft tongue 21 and bracing member 23 laterally toward the right as indicated in dotted lines in Figure 1, after raising the platform to clear the draft tongue. The tongue 21 can be secured in this position by replacing the bolt 24 through a suitable aperture 27 in the frame member 20 in this location.

The front end of the thresher body 11 is provided with a crop receiving opening 30 through which crops are fed to the threshing cylinder 12, by means which will now be described. Extending forwardly from the front opening 30 in the body 11 is a feeder house 31, which is mounted on the body by means of a transverse shaft 32, providing for vertical swinging movement of the feeder house 31 relative to the body 11. The feeder house is provided with a floor plate 34 and side walls 33, and is covered by a top plate 35.

A harvester platform 36 extends forwardly and laterally from the front end of the feeder house 31 and includes a transversely extending platform trough 37, having rearwardly and upwardly extending back wall 38, and a pair of side walls 39, 40 at opposite ends of the platform trough 37, respectively. The side walls 39, 40 are extended forwardly to provide grain dividers 41, as is well-known to those skilled in the art. The stubbleward side wall 39 is substantially a forwardly extending continuation of the stubbleward side wall 33 of the feeder house 31 and the entire platform 36 is rigidly mounted on the forward end of the feeder house 31 and is swingable therewith as a unitary structure about the axis of the transverse supporting shaft 32. The means for controlling the platform and feeder house about the shaft 32 are omitted for the sake of simplicity, since such raising and lowering means are well-known to those skilled in the art. The grainward end of the platform 36 is carried on an arm 42, the upper end of the latter being mounted on a tubular beam member 43, which is disposed with its major axis in alignment with the axis of vertical swinging movement of the feeder house 31 about the shaft 32. The outer end of the tubular member 43 is mounted on a supporting arm 44, which is fixed to the main transverse beam member 14, while the inner end of the member 43 is supported on the body 11. Thus, by virtue of the pivotal connection of the feeder house 31 and the supporting arm 42, the feeder house and the platform swing about a single axis as a rigid unitary structure.

A cutter bar and sickle, indicated generally by reference numeral 45, extends across the entire width of the platform 36 and is attached along the forward edge of the platform. This cutting apparatus can be of any suitable type known in the art and can be driven by any suitable means, which is also omitted for the fact of simplicity, since it is not important in the understanding of the principles of the present invention.

The crops which are severed by the cutting apparatus 45 are laid back into the trough 37 by means of a reel 46 of conventional type, the reel being carried on a shaft 47, supported at opposite ends, thereof, on a pair of arms 48 and standards 49, secured to opposite end walls 39, 40 of the platform, respectively. The harvested crops are conveyed laterally toward the feeder house 31 by means of an auger conveyor, indicated in its entirety by the reference numeral 50, comprising a tubular member 51 mounted on a shaft 52 by means of a plurality of spiders 53, and a helical blade or vane 54 is wound about the outer surface of the tubular member 51 and is rigidly fixed thereto, as by welding. The helical blade 54 extends from the grainward end of the tubular member 51 to a point inwardly of the side wall 33 of the feeder house. The tubular member 51, however, extends over the entire width of the platform from the grainward end wall 40 to the stubbleward end wall 39, between the cutter bar 45 and the front end of the feeder house 31. A short section of blade 55 is wound helically about the stubbleward end of the tubular member 51 in the opposite direction to that of the blade 54. The adjacent ends of the two blades 54, 55 terminate preferably in laterally spaced relation near the central portion of the front opening 56 in the feeder house 31. The spacing between the two ends may be varied somewhat or they may be interconnected by a blade portion lying in an axial plane, as will be understood by those skilled in the art.

The supporting shaft 52 for the auger 50 is journaled at opposite ends, respectively, in a pair of bearings 57, 58, mounted on the opposite end walls 39, 40 of the platform 36, respectively. The auger is driven in a clockwise direction as viewed in Figures 2 and 3 by any suitable means (not shown), causing crops to be moved laterally inwardly from the grainward end of the platform toward the feeder house. At the same time, the crops that are cut by the portion of the cutter bar 45 in front of the feeder house are engaged by the oppositely wound blade section 55 and are bunched together with the incoming crops by the adjacent ends of the blades 54, 55 and are urged into the front opening 56 in the feeder house 31. The crops are moved rearwardly in the feeder house 31 by means of a flexible endless conveyor member 60 trained over a pair of front and rear rotatable supports or rollers 61, 62 disposed in a depressed forward portion 63 of the floor 34 of the feeder house 31. The front roller 61 is disposed transversely beneath the auger 50 and the rear roller 62 is disposed intermediate the front and rear ends of the feeder house 31 and positioned at the rear end of the depressed portion 63 of the floor.

As is well-known to those skilled in the art, harvested crops tend to wind around an auger conveyor unless a stripper is provided. Accordingly, I have provided stripping means comprising a stripper plate 65 extending forwardly from the back wall 38 and having a downwardly turned stripper edge 66 along the forward edge of the plate 65. The plate 65 and stripper edge 66 extend along the entire length of the back wall 38 from the grainward end wall 40 to the grainward wall of the feeder house 31. Since the auger turns in a clockwise direction, the auger blade 54 moves upwardly past the stripper edge 66, whereby the latter engages any crops that tend to carry over the top of the auger and confines the crops to a space between the auger, the back wall 38, and the stripper plate 65. Similarly, the top plate 35 of the feeder house is turned downwardly along its forward edge to provide a stripper edge 69, which terminates adjacent the edges of the blades 54, 55 in front of the feeder house 31, thereby preventing the crop material from being carried over by the auger 50.

Additional stripping means is provided in the form of a flexible endless member 75, preferably a pair of chains 75' interconnected by a plurality of transverse slats 82. The flexible member 75 is trained over three rotatable supporting sprockets or rollers 76, 77, 78, disposed transversely within the feeder house and arranged in triangular formation, as viewed in Figure 2. The foremost roller or supporting member 76 is mounted on a shaft 79, journaled in bearings 80 mounted on opposite side walls 33 of the feeder house 31 at the forward end thereof. The roller 76 is disposed immediately behind the stripper edge 69 in order that the flexible endless member 75, trained thereover, has a movement downwardly and rearwardly relative to the auger blades 54, 55, for the purpose of stripping crop material therefrom and moving it rearwardly within the feeder house. The second roller 77 is journaled in bearings 81, mounted on the opposite side walls 33 of the feeder house 31, near the floor plate 34, so that the endless conveyor member 75 travels rearwardly from the foremost roller 76, and substantially horizontally over the lower feeder member 60 and cooperates with the latter to compress the crop material into a comparatively thin ribbon, which is then shifted upwardly and rearwardly along the floor plate 34 by virtue of its engagement with the endless member 75 and is delivered at the rear of the feeder house 31 to the threshing cylinder 12. The rearmost roller 78 is journaled for rotation about the axis of the shaft 32, on which axis the platform and feeder house is vertically swingable, as described above. The shaft 32 and roller 78 are driven in a clockwise direction as viewed in Figure 2, to move the conveyor by a suitable power transmitting mechanism (not shown) connected to a drive sprocket 74 on the outer end of the shaft 32. Thus, the flexible member 75 travels upwardly and rearwardly in spaced relation above the floor plate 34 in engagement with the crop material and moves substantially parallel to the floor plate to deliver the crop material to the threshing cylinder. The flexible member 75 then passes around the upper or rearmost roller 78 and returns along the top of the feeder house to the front roller 76. Both the upper and lower flexible endless feeder members 75 and 60 are provided with transverse slats 82, 83 for the purpose of engaging the crop material in the feeder house.

It will now be evident to those skilled in the art that a harvester embodying the principles of the present invention has a cutting width which is nearly equal to the overall width of the machine when the latter is conditioned for transport when the draft tongue 21 is connected in transport position as indicated in dotted lines in Figure 1. Since the total width is limited by the width of gates through which entrance to the field is attained, my harvesting machine can be built for cutting widths in the order of 8 to 10 feet without the necessity of removing the platform or a portion thereof for transport. This compares favorably with conventional combines and other harvesters in which the cutter bar does not extend across the forward end of the feeder house but in which the entire crop is delivered to a side opening in the feeder house. Of course, the same result is obtained in combines of the straight through type wherein the body of the combine is equal in width to the platform and cutter bar, but in such machines the width is limited by the practical limit of the length of the threshing cylinder, whereas in the present invention, the length of the cylinder is independent of the width of the platform.

Referring now more particularly to Figures 4, 5 and 6, showing a modification of the invention, in which similar parts are indicated by similar reference numerals to which the suffix "a" is attached. In this embodiment of my invention, the lower feeder 60 is eliminated by the use of a modified arrangement of the upper feeder which will now be described. This feeder is indicated in its entirety by reference numeral 90 and comprises a flexible endless member 91 which is trained over three rotatable supports such as sprockets or rollers 92, 93, 94. The front roller 92 is mounted on a shaft 95, which is journaled in bearings 96 mounted on opposite side walls 33a of the feeder house 31a. The second roller 93 is mounted rearwardly and beneath the axis of the front roller 92, and the floor plate 34a of the feeder house 31a is somewhat steeper than in the first embodiment, so that the flight 98 of the endless member 91 between the first two rollers 92, 93 is positioned substantially tangential to the blades 54a, 55a of the auger 50a. This arrangement disposes the second roller 93 appreciably closer to the auger 50a, so that the lower flight 98 of the endless member 91 engages the crop material immediately behind the auger blades and carries it rearwardly and upwardly along the floor plate 34a. This lower flight is also substantially parallel to the floor plate 34a.

In this embodiment, the rear roller 94 is also mounted on the axis of vertical swinging movement of the platform and feeder house, and an auxiliary beater 100 is provided to assist in delivering the crop material from the floor plate 34a of the feeder house to the threshing cylinder 12a. The beater 100 is rotatably disposed between the roller 94 and the threshing cylinder, thereby providing a positive feed of crop material to the cylinder.

It will be noted that this embodiment also includes the stripper 65a with the downwardly extending stripper edge 66a extending along the platform and also the stripper edge 69a formed as a downwardly extending continuation of the top of the feeder house 31a.

The threshed grain is collected in a grain tank 101 of conventional type. In this embodiment, the draft tongue 21a is shifted laterally after removing the bolt 25a into the position shown in dotted lines and secured therein by replacing the bolt 25a in the tongue 21 and through an aperture 28 in a bracket 29, the latter being rigidly mounted on the draft member 20a.

In this embodiment, the tubular platform beam member 43 is omitted, the platform arm 42a being pivotally connected directly to the supporting arm 44a, which is mounted on a superstructure 44b on the main transverse beam 14a to position the pivot connection in coaxial relation to the shaft 32a on which the feeder house 31 is swingably mounted.

I do not intend my invention to be limited to the details shown and described herein, except as set forth in the claims which follow.

I claim:

1. In a harvester, a fore and aft extending feeder house open at the front, a platform extending across the forward end of said feeder house and laterally from said front opening, a pair of side walls along opposite ends of said platform and a back wall along the rear thereof, a cutter bar extending between said side walls, an auger conveyor extending transversely along said platform and across the forward end of said feeder house, a stripper extending along said back wall and having a downwardly projecting edge adapted to strip crops from said auger, stripping means along the forward edge of the top side of said feeder house including a downwardly projecting edge adapted to strip crops from said auger, and a feeder in said feeder house for receiving crops from said auger and for moving them rearwardly.

2. In a harvester, a fore and aft extending feeder house open at the front, a platform extending across the forward end of said feeder-house and laterally from said front opening, a pair of side walls along opposite ends of said platform and a back wall along the rear thereof, a cutter bar extending between said side walls, an auger conveyor extending transversely along said platform and across the forward end of said feeder house, a stripper extending along said back wall and having a downwardly projecting edge adapted to strip crops from said auger, stripping means along the forward edge of the top side of said feeder house comprising a flexible endless member in said feeder house and a rotatable support therefor, said support being positioned above said auger, and means for moving said endless member around said support and rearwardly therefrom in proximity to said auger to strip crops from the latter and transport them rearwardly in said feeder house.

3. In a harvester, a fore and aft extending feeder house open at the front, a platform extending across the forward end of said feeder house and laterally from said front opening, a pair of side walls along opposite ends of said platform and a back wall along the rear thereof, a cutter bar extending between said side walls, an auger conveyor extending transversely along said platform and across the forward end of said feeder house, a stripper extending along said back wall and having a downwardly projecting edge adapted to strip crops from said auger, stripping means along the forward edge of the top side of said feeder house comprising a flexible endless member in said feeder house and a pair of fore and aft spaced rotatable supports therefor, and means for moving said endless member generally downwardly in proximity to said auger and generally rearwardly to move crops delivered thereto by said auger.

4. In a harvester, a fore and aft extending feeder house open at the front, a platform extending across the forward end of said feeder house and laterally from said front opening, a pair of side walls along opposite ends of said platform and a back wall along the rear thereof, a cutter bar extending between said side walls, an auger conveyor extending transversely along said platform and across the forward end of said feeder house, a stripper extending along said back wall and having a downwardly projecting edge adapted to strip crops from said auger, stripping means along the forward edge of the top side of said feeder house comprising a flexible endless member in said feeder house and a pair of fore and aft spaced supports therefor, the forwardmost of said supports being in proximity to said auger to cause said endless member to strip crops from said auger as said member moves downwardly around said support and the other of said supports being disposed near the floor of said feeder house, whereby said endless member is positioned in spaced relation above said feeder house floor engageable with crops thereon to move them rearwardly in said feeder house.

5. In a harvester, a fore and aft extending feeder house open at the front, a platform extending across the forward end of said feeder house and laterally from said front opening, a pair of side walls along opposite ends of said platform and a back wall along the rear thereof, a cutter bar extending between said side walls, an auger conveyor extending transversely along said platform and across the forward end of said feeder house, a stripper extending along said back wall and having a downwardly projecting edge adapted to strip crops from said auger, stripping means along the forward edge of the top side of said feeder house comprising a downwardly projecting edge adapted to strip crops from said auger, a rotatable support disposed behind said stripping edge, and a flexible endless member trained over said support and movable downwardly in proximity to said auger.

6. In a harvester, a fore and aft extending feeder house open at the front, a platform extending across the forward end of said feeder house and laterally from said front opening, a pair of side walls along opposite ends of said platform and a back wall along the rear thereof, a cutter bar extending between said side walls, an auger conveyor extending transversely along said platform and across the forward end of said feeder house, a stripper extending along said back wall and having a downwardly projecting edge adapted to strip crops from said auger, stripping means along the forward edge of the top side of said feeder house comprising a flexible endless member and three rotatable supports therefor in said feeder house, one of said supports being disposed above said auger, the second support being disposed rearwardly of said auger near the floor of the feeder house, and the third support being disposed at the rear of the feeder house, and means for moving said endless member over said supports in a direction downwardly around said first support and rearwardly therefrom for stripping crops from said auger, and rearwardly in spaced relation above said feeder house floor between said second and third supports for transporting crops through said feeder house.

7. The combination set forth in claim 6 including the further provision of a second endless member beneath said auger and extending rearwardly therefrom in converging relation to the first mentioned endless member and cooperable therewith to deliver the crops rearwardly in said feeder house.

8. The combination set forth in claim 6 including the further provision that said first and second rotatable supports are disposed to position the endless member therebetween substantially tangential relative to said auger to provide for efficient stripping action of said flexible member as the latter moves rearwardly relative to the auger.

9. In a harvester, a fore and aft extending feeder house open at the front, a platform extending across the forward end of said feeder house and laterally from said front opening, a pair of side walls at opposite ends of said platform, respectively, and a back wall along the rear thereof, a cutter bar extending between said side walls, an auger conveyor extending transversely along said platform and in front of said feeder house, a stripper extending along said back wall and having an edge adjacent the auger to strip crops therefrom, stripping means over said feeder house opening comprising a flexible endless member and a pair of fore and aft spaced rotatable supports therefor, said endless member being positioned to move generally downwardly in proximity to the upper part of said auger to strip crop material therefrom and generally rearwardly to move said material rearwardly in said feeder house, and a second endless member beneath said auger and extending rearwardly therefrom beneath said first endless member and cooperable with the latter to deliver the crops rearwardly in said feeder house.

10. In a harvester, a fore and aft extending feeder house open at the front, a platform extending across the forward end of said feeder house and laterally from said front opening, a pair of side walls at opposite ends of said platform, respectively, and a back wall along the rear thereof, a cutter bar extending between said side walls, an auger conveyor extending transversely along said platform and in front of said feeder house, a stripper extending along said back wall and having an edge adjacent the auger to strip crops therefrom, stripping means over said feeder house opening comprising a flexible endless member and a pair of fore and aft spaced rotatable supports therefor, said endless member being positioned to move generally downwardly in proximity to the upper part of said auger to strip crop material therefrom and generally rearwardly to move said material rearwardly in said feeder house, the rearwardly movable portion of the endless member being substantially in transverse alignment with said stripper on the back wall.

11. In a harvester, a fore and aft extending feeder house open at the front, a platform extending across the forward end of said feeder house and laterally from said front opening, a pair of side walls at opposite ends of said platform, respectively, and a back wall along the rear thereof, a cutter bar extending between said side walls, an auger conveyor extending transversely along said platform and in front of said feeder house, a stripper extending along said back wall comprising a generally horizontal plate extending forwardly from said back wall and having an outer edge terminating adjacent said auger, and a stripping device over said feeder house opening comprising a flexible endless member and a rotatable support therefor over which said member is trained for movement downwardly in proximity to the upper part of said auger to strip crop material therefrom and rearwardly substantially in the plane of said horizontal plate.

12. In a harvester, a fore and aft extending feeder house open at the front, a platform extending across the forward end of said feeder house and laterally from said front opening, a pair of side walls at opposite ends of said platform, respectively, and a back wall along the rear thereof, a cutter bar extending between said side walls, an auger conveyor extending transversely along said platform and in front of said feeder house, a stripper extending along said back wall comprising a generally horizontal plate extending forwardly from said back wall and having an outer edge terminating adjacent said auger, and a stripping device over said feeder house opening comprising a flexible endless member and a rotatable support therefor over which said member is trained for movement downwardly in proximity to the upper part of said auger to strip crop material therefrom and rearwardly substantially in the plane of said horizontal plate, and a second endless conveyor beneath said auger and extending rearwardly therefrom beneath said first endless member and cooperable therewith to deliver the crops rearwardly in said feeder house.

13. In a harvester, a fore and aft extending feeder house open at the front, a platform extending across the forward end of said feeder house and laterally from said front opening, a pair of side walls at opposite ends of said platform, respectively, and a back wall along the rear thereof, a cutter bar extending between said side walls, an auger conveyor extending transversely along said platform and in front of said feeder house, said auger including a supporting shaft journaled on said side walls and a pair of helical vanes encircling said shafts in relatively opposite directions and extending laterally from adjacent points in front of the opening in said feeder house, a stripping device over said feeder house opening comprising a flexible endless member and a rotary support therefor over which said member is trained for movement downwardly in proximity to the upper part of said auger over the terminals of both of said helical vanes, to strip crop material therefrom.

14. In a harvester, a fore and aft extending feeder house open at the front, a platform extending across the forward end of said feeder house and laterally from said front opening, a pair of side walls at opposite ends of said platform, respectively, and a back wall along the rear thereof, a cutter bar extending between said side walls, an auger conveyor extending transversely along said platform and in front of said feeder house, said auger including a supporting shaft journaled on said side walls and a pair of helical vanes encircling said shafts in relatively opposite directions and extending laterally from adjacent points in front of the opening in said feeder house, a stripping device over said feeder house opening comprising a flexible endless member and a rotary support therefor over which said member is trained for movement downwardly in proximity to the upper part of said auger over the terminals of both of said helical vanes, to strip crop material therefrom, and a second endless conveyor beneath said auger and extending rearwardly therefrom beneath said endless stripping member and cooperable therewith to deliver the crops rearwardly in said feeder house.

15. In a harvester, a fore and aft extending feeder house open at the front, a platform extending across the forward end of said feeder house and laterally from said front opening, a pair of side walls at opposite ends of said platform, respectively, and a back wall along the rear thereof, a cutter bar extending between said side walls, an auger conveyor extending transversely along said platform and in front of said feeder house, said auger including a supporting shaft journaled on said side walls and a pair of helical vanes encircling said shafts in relatively opposite directions and extending laterally from adjacent points in front of the opening in said feeder house, a stripping device over said feeder house opening comprising a flexible endless member and a pair of rotary supports over which said member is trained, said supports being disposed adjacent said auger in overlapping relation to said terminals of said helical vanes to guide said flexible member in proximity to said vanes and substantially tangent thereto, to strip crop material therefrom and to move the same rearwardly in said feeder house.

16. In a harvester, a fore and aft extending feeder house open at the front, a platform extending across the forward end of said feeder house and laterally from said front opening, a pair of side walls at opposite ends of said platform, respectively, and a back wall along the rear thereof, a cutter bar extending between said side walls, an auger conveyor extending transversely along said platform and in front of said feeder house, a stripper extending along said back wall and having an edge adjacent the auger to strip crops therefrom, stripping means over said feeder house opening comprising a flexible endless member and a pair of fore and aft spaced rotatable supports therefor, said endless member being positioned to move generally downwardly in proximity to the upper part of said auger to strip crop material therefrom and generally rearwardly to move said material rearwardly in said feeder house, a third rotatable support adjacent the rear end of the feeder house over which said flexible endless member is trained providing for movement of said member rearwardly to move crops to a point of delivery in said feeder house, and a rotary feeder device disposed beyond said third support for stripping crops from said flexible member and for feeding them rearwardly.

ALVIN W. OEHLER.